No. 694,770. Patented Mar. 4, 1902.
W. MITCHELL.
VAPOR HEATED SMOOTHING IRON.
(Application filed Oct. 3, 1900. Renewed Jan. 14, 1902.)
(No Model.) 2 Sheets—Sheet 1.
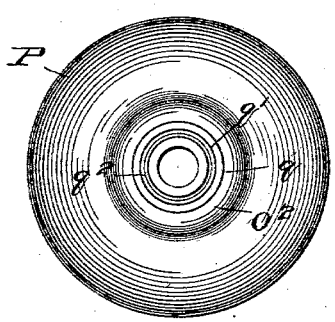
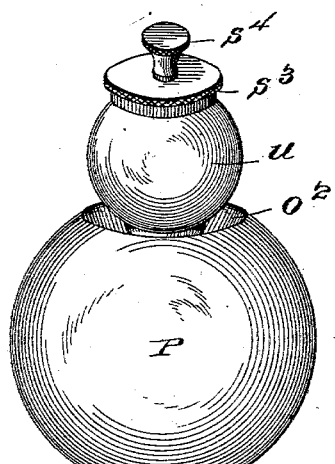
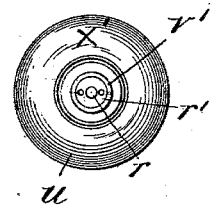
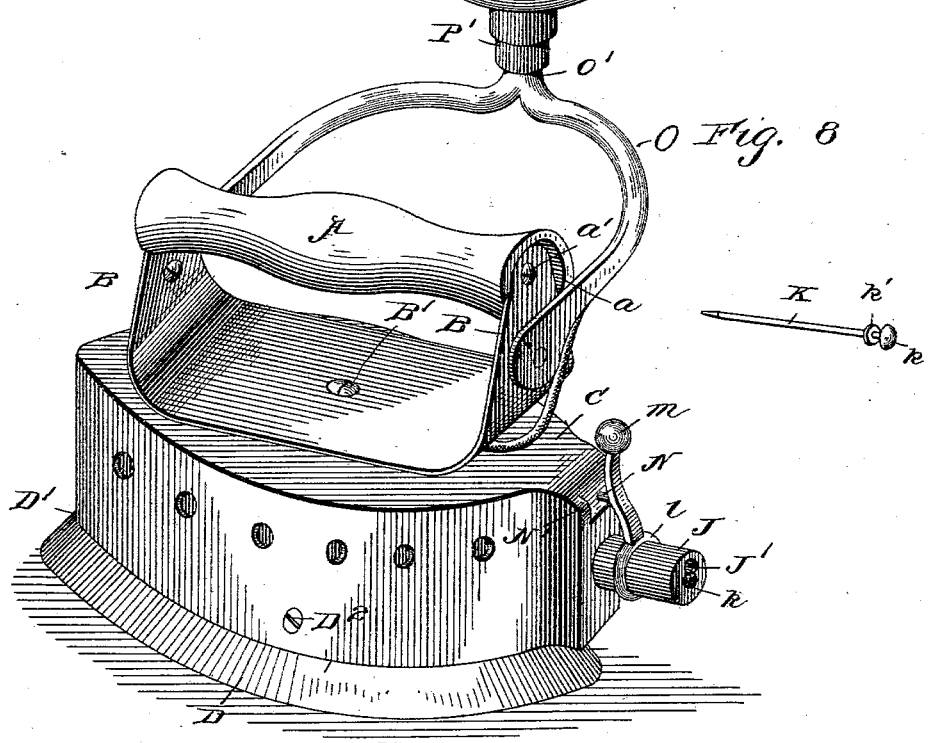
WITNESSES
INVENTOR,
Willis Mitchell
Attorney
THE NORRIS PETERS CO., PHOTO-LITHO., WASHINGTON, D. C.

No. 694,770. Patented Mar. 4, 1902.
W. MITCHELL.
VAPOR HEATED SMOOTHING IRON.
(Application filed Oct. 3, 1900. Renewed Jan. 14, 1902.)
(No Model.) 2 Sheets—Sheet 2.
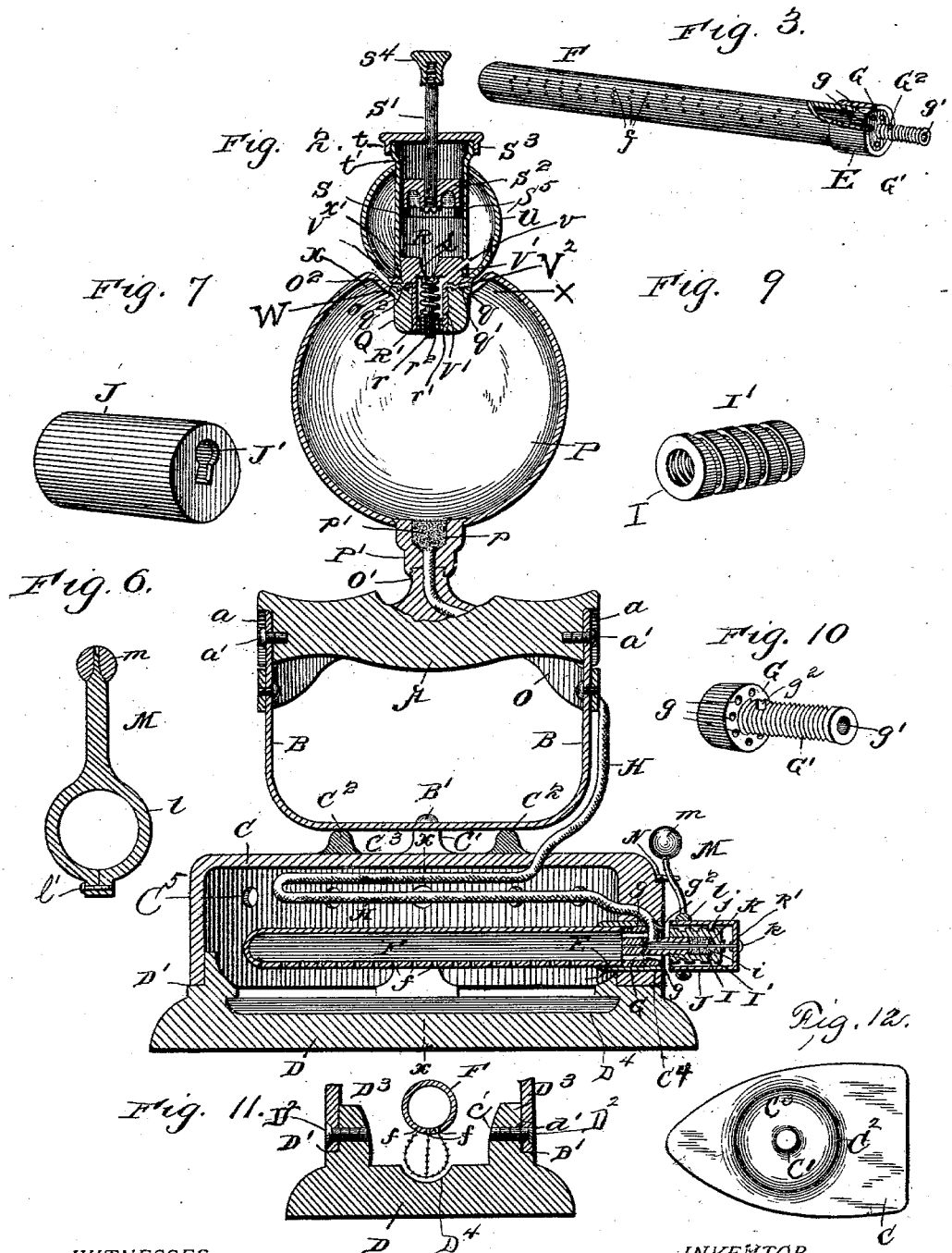
WITNESSES
Florence Fieser
Fred Glorius
INVENTOR
Willis Mitchell
by W H Babcock
Attorney

UNITED STATES PATENT OFFICE.

WILLIS MITCHELL, OF MALDEN, MASSACHUSETTS, ASSIGNOR TO THE MITCHELL GAS GENERATOR AND BURNER COMPANY, OF BOSTON, MASSACHUSETTS, A CORPORATION OF NEW JERSEY.

VAPOR-HEATED SMOOTHING-IRON.

SPECIFICATION forming part of Letters Patent No. 694,770, dated March 4, 1902.

Application filed October 3, 1900. Renewed January 14, 1902. Serial No. 89,771. (No model.)

*To all whom it may concern:*

Be it known that I, WILLIS MITCHELL, a citizen of the United States, residing at Malden, in the county of Middlesex and State of Massachusetts, have invented certain new and useful Improvements in Vapor-Heated Smoothing-Irons; and I do hereby declare the following to be a full, clear, and exact description of the invention, such as will enable others skilled in the art to which it appertains to make and use the same.

This invention relates to smoothing-irons heated by gasolene or equivalent easily-vaporizable inflammable fluid, and has for its principal objects to increase the efficiency of the burner in heating the bottom of the iron; to improve the devices for regulating the supply of vaporous fuel to said burner; to facilitate the insertion and removal of the burner and parts attached thereto, while securing strength and rigidity in the same and in the mounting thereof; to provide ready detachability of the parts of the iron-body with firmness and safety; to protect the passage of the gasolene from the reservoir to the burner and keep the gasolene-pipe out of the way; to provide improved connections between the air-chamber, air-pump, gasolene-reservoir, and their support, and generally to increase the simplicity, compactness, efficiency, strength, and cheapness of the gasolene-heated smoothing-iron as a whole.

To these ends my invention consists in the construction and combination of the several parts of the self-supplied vapor-heated smoothing-iron and its appurtenances, substantially as hereinafter set forth and claimed.

In the accompanying drawings, Figure 1 represents a perspective external view of a self-feeding vapor-heated smoothing-iron embodying my invention. Fig. 2 represents a longitudinal section of the same on the central line. Fig. 3 represents a detail view of the burner-cylinder and jet-block partly broken away to more clearly exhibit the latter and showing the three rows of perforations. Fig. 4 represents a detail plan view of the liquid-reservoir, the air-chamber being removed. Fig. 5 represents a bottom view of the base-block of the air-pump and the shell of the said chamber. Fig. 6 represents an enlarged detail sectional view of the lever which operates the regulating needle-valve. Fig. 7 represents an enlarged external perspective detail view of the cylinder to which said lever is clamped. Fig. 8 represents a detail veiw of the valve, its head, and collar. Fig. 9 represents a detail view of the spirally-grooved relatively fixed sleeve with which the internal pin of the cylinder engages. Fig. 10 represents a detail view of the jet-block. Fig. 11 represents a transverse vertical section through the body of the smoothing-iron on the line $x\ x$ of Fig. 2; and Fig. 12 represents a detail plan view of the top shell of the smoothing-iron, showing the annular rib $C^2$.

A designates the smoothing-iron handle, which is wooden and of ordinary form, having the upward ends of U-shaped handle-support B set into recesses $a$ of its ends and fastened by screws $a'$. A larger screw B' passes through the bottom of the said support, at the middle thereof, engaging with a screw-tapped boss C' on the top of the upper shell C of the smoothing-iron body. An annular rib $C^2$, also raised on the said shell and concentric with said boss, but at a considerable radial distance from the latter, affords a sufficient base for the said support, lessening the oblique strain on screw B' during ironing. The broad annular air-space $C^3$ between said support and said shell surrounding said boss and surrounded by said rib greatly reduces the amount of heat conducted to the said support as compared with contact at all points of the bottom of said support. The latter is broad enough to screen the operator's hand from radiant heat. The said shell has the usual smoothing-iron outline, and its edge rests at all points on a flat shoulder D' of the base or bottom D, to which it is fastened by screws $D^2$, passing through registering holes $d'$ of said shell and $c'$, Fig. 11, of standards $D^3$, integral with said base and raised thereon just within the wall of the said shell to brace the same. The latter holes are threaded to engage the said screws, which thus provide for detachability of the two parts of the iron-body, though holding them firmly together.

The hollow shell C and base D are of cast metal, which is thicker at the broad end of the former than elsewhere and provided in the middle of the said end with a circular opening $C^4$ to receive a cylinder or sleeve E, in which is fitted the open receiving end of a metallic burner F, having three longitudinal parallel rows of small holes $f$ in its under side and the general shape of an elongated glove-finger. The upper face of the bottom part or base D is provided at $D^4$ with an elongated depression of similar shape arranged to present the surface of the metal at one-half inch from the said burner. The jets of flame issuing from the three series of holes $f$ converge in this hollow, as indicated by the arrows, the peculiar relative shape and arrangement of the parts described insuring an intense and highly effective heating action on the said base. A jet-block G is fitted into the outer end of the said cylinder or sleeve E. The said sleeve, burner, and jet-block being then practically a single piece are then passed into the iron, the said cylinder E being hard-soldered thereto in said opening $C^4$ or made fast in any other reliable way. The jet-block, as usual, has air-holes $g$ through it and a rearwardly-extending stem G', which is externally screw-threaded and has an internal longitudinal bore forming a jet-hole $g'$. A branch passage $g^2$, which may pass through the head of the jet-block, as in Fig. 2, or through the stem, as in Fig. 10, leads through the side of the said head or stem and receives the lower end of the gasolene-supply pipe H. A packing-box I, having a central bore in line with that of said stem, screws on the latter and is provided with packing $i$. It has also an external groove or thread I', winding helically in direction opposite to that of its internal screw-threads. A loose cylinder or long adjusting-cap J is set over this sleeve and provided with an internal pin $j$, which enters the groove I'. A needle-valve K extends through the registering bores of said grooved sleeve and jet-block to the jet-hole of the latter. Its head $k$ is detachably but securely held in the head of cylinder or cap J by a keyhole-slot J' therein, there being a fixed collar $k'$ on the rod of the said valve at a distance from the said valve-head equal to the thickness of the said cylinder-head in order that the movement of the said cylinder in either longitudinal direction may take the said valve with it. The fit of the said collar and valve-head against the said cylinder-head is, however, loose enough to permit the cylinder to turn without turning the valve. A split ring $l$ is slipped upon the said cylinder and clamped by a screw $l'$, thus fastening detachably but firmly on said sleeve the operating-lever M, which is integral with the said ring and provided with a convenient grasping-knob $m$. A lug or pin N, projecting from the proximate end of the shell C, constitutes a stop for the travel of the said lever and sleeve in a rotary path in either direction. The screwing of the grooved sleeve on the jet-block stem is so tight that the action of the pin $j$ on the wall of the groove I' will not loosen it, and the helical form of the groove will of course compel the cylinder and valve to move outward or inward, according to the direction of motion of the said lever, thus opening or closing the jet-hole either wholly or to the extent desired.

The supply-pipe H, before mentioned, extends back within the shell C nearly to the forward end thereof, then back again nearly to the front, and up through the top of the same into and through one arm of a bifurcated bent standard O, following a longitudinal passage of the same to a filtering-pocket $p$ in the bottom of a globular gasolene-reservoir P. The connection between the said bifurcated standard and the said reservoir is made by a metallic coupling P', which constitutes a part of the bottom of the latter and screws upon a screw-threaded upwardly-extending neck O' of the former. The said pocket is formed in the said coupling and contains ordinary filtering material $p'$. The said standard is bent out laterally to avoid the handle A and afford room for grasping the same. The top of the said reservoir is provided with a concavity $O^2$, leaving a surrounding air and vapor space X above its lower edge, at the bottom of which concavity is an opening the edge $o$ of which receives the flange $q$ at the upper end of a tubular internally-screw-threaded coupling-block Q, extending down into the said reservoir. The top of this coupling-block is provided with an annular groove $q'$, having a raised annular ridge $q^2$ in its middle. The bore of this block receives a correspondingly-screw-threaded tubular stem V' of a base-block V for an air-pump and air-chamber. An air-outlet valve R, pressed upward by a spring R', works up and down in the said tubular stem, its rod $r$ working through a central hole $r^2$ in a block or nut $r'$, fitted into the lower end of the said stem V'.

The block V has at its bottom a lateral annular shoulder $V^2$, on which the lower edges of the pump-cylinder S and the surrounding approximately globular air-receptacle U are fitted. It is also provided with a vertical tapering air-outlet passage $s$ from said cylinder and with an oblique straight cylindrical air-passage $v$ from the air-receptacle or air-chamber U to the interior of the tubular stem V'. A piston-rod S', extending up through the head $S^3$ of the said cylinder, is connected to a piston $S^2$ therein and reciprocates the same, being provided with a knob or handle $S^4$ for the convenience of such action. Packing $S^5$ is provided for the hollow lower face of the said piston to lessen the shock of impact when said piston reaches the bottom of its travel. The cylinder-head $S^3$ has an annular flange $t$ at its periphery, extending downward to fit on a circumferential enlargement $t'$ of the upper end of the said cylinder.

The bottom of base-block V has an annular ridge $x'$, which rests upon the ridge $q^2$ aforesaid when the two blocks Q and V are screwed together. A ring W, of fibrous packing, is fitted into groove $q'$, and these two ridges bite into it from opposite sides, making a tight joint. The concavity $O^2$ allows the air-chamber to be set lower.

The operation is as follows: The air-pump piston is reciprocated, forcing the air into the gasolene-reservoir around the stem of the outlet-valve R, which it opens, also into the air-chamber through the passage V. The liquid gasolene is forced out through the filter and gasolene-pipe H to the jet-block and (the needle-valve being adjusted to open the jet-hole) flows into the burner, escaping as vapor through the holes in the bottom of the latter into the interior of the smoothing-iron. Owing to the volatile nature of gasolene, a certain amount of vapor will always follow the path indicated in advance of the liquid. This is ignited through the air-holes $C^5$ in the upper part of shell C, and the flame is communicated at once to the holes $f$ of the burner. The heat thus produced vaporizes the gasolene in the bent part of pipe H, which is, in effect, a generator, within the said body and supplies a continual flow of vapor to the jet-block and burner. As the base and the shell fitted thereon are heated, the radiation from every side raises the temperature of the said generator to such a degree that far more vapor is generated than the burner can consume. The remainder flows back up through the said pipe H in the form of bubbles, taking a course exactly opposite to the flow of liquid through the same. These bubbles pass up through the liquid in the gasolene-reservoir and expand into the space X at the top of the same, a certain part of the vapor also passing up into the air-chamber when its pressure becomes great enough to overcome that of the air therein. The combined pressure of the vapor thus accumulating and the air previously compressed and supplied, as before stated, aids gravity in forcing the liquid down through pipe H and of course greatly accelerates the flow. The air-pump is used only in starting the iron, which at once becomes self-feeding. Of course other inflammable and volatile liquid may be substituted for gasolene, and the details of the device may be varied considerably without departing from the spirit and scope of my invention.

The valve R when in its highest or closed position cuts off the flow of air or vapor from the air-chamber or gasolene-reservoir to the pump-cylinder, or vice versa, but permits the flow in either direction between the air-chamber and said reservoir. This is the normal position and arrangement of the device.

I do not claim in this application the heating and oil-supplying devices hereinbefore described, the same forming the subject-matter of application, No. 40,362, filed December 19, 1900.

Having thus described my invention, what I claim as new, and desire to secure by Letters Patent, is—

A smoothing-iron body having the upper face of its bottom plate horizontal, but supplied with a central longitudinal depression, which is concave in cross-section, in combination with a burner arranged above the said depression and corresponding in shape and size thereto, means for fastening the said burner in the said body and means for supplying vapor thereto, the said burner being provided with parallel rows of holes in its lower side and arranged opposite to the said depression for the purpose of causing the jets of flame from the holes to converge within the depression substantially as shown and described.

In testimony whereof I affix my signature in presence of two witnesses.

WILLIS MITCHELL.

Witnesses:
NELLIE LOUISE BARRY,
ERNEST B. CONANT.